United States Patent
Truax et al.

(10) Patent No.: US 8,510,050 B2
(45) Date of Patent: Aug. 13, 2013

(54) SYSTEMS AND METHODS FOR DOWNHOLE FLUID TYPING WITH PULSED NEUTRON LOGGING

(75) Inventors: Jerome Truax, Humble, TX (US); Steve Zannoni, Houston, TX (US); Daniel Dorffer, Houston, TX (US); Weijun Guo, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 116 days.

(21) Appl. No.: 13/124,930

(22) PCT Filed: Sep. 28, 2009

(86) PCT No.: PCT/US2009/058521
§ 371 (c)(1),
(2), (4) Date: Apr. 19, 2011

(87) PCT Pub. No.: WO2011/037583
PCT Pub. Date: Mar. 31, 2011

(65) Prior Publication Data
US 2011/0202276 A1    Aug. 18, 2011

(51) Int. Cl.
*G01V 1/40* (2006.01)
(52) U.S. Cl.
USPC ............................................................. 702/6
(58) Field of Classification Search
USPC .......................................... 702/6, 7, 8, 11, 12
See application file for complete search history.

(56) References Cited

U.S. PATENT DOCUMENTS

| 3,156,822 A | 11/1964 | Tittman |
| 4,095,102 A | 6/1978 | Tixier |
| 5,825,024 A | 10/1998 | Badruzzaman |
| 6,052,649 A * | 4/2000 | Goldman et al. ............... 702/11 |
| 6,207,953 B1 * | 3/2001 | Wilson ....................... 250/269.4 |
| 6,936,812 B2 | 8/2005 | Odom et al. |
| 7,253,402 B2 | 8/2007 | Gilchrist et al. |
| 7,294,829 B2 | 11/2007 | Gilchrist |

(Continued)

FOREIGN PATENT DOCUMENTS

| CA | 2701109 A1 | 3/2009 |
| GB | 2427024 A | 12/2006 |

(Continued)

OTHER PUBLICATIONS

Australian Examiner's First Report issued Jan. 13, 2012 for AU Patent Application No. 2009353039, 2 pages.

(Continued)

*Primary Examiner* — Aditya Bhat
(74) *Attorney, Agent, or Firm* — Smith IP Services, P.C.

(57) ABSTRACT

Downhole fluid typing with pulsed neutron logging. A method comprises obtaining at least one capture gamma count rate at a particular borehole depth, calculating a fluid type indicative response value for the borehole depth, and determining at least one fluid type based on the response value. A system comprises a downhole tool, including a neutron source, at least one gamma detector, and a processor coupled to a memory. The memory stores a program that, when executed by the processor, causes the processor to obtain at least one capture gamma count rate for a particular borehole depth. The processor calculates a fluid type indicative response value for the borehole depth and determines at least one fluid type based on the response value.

26 Claims, 5 Drawing Sheets

(56) References Cited

U.S. PATENT DOCUMENTS

| | | | |
|---|---|---|---|
| 7,361,887 B2 | 4/2008 | Trcka et al. | |
| 7,365,307 B2 | 4/2008 | Stoller et al. | |
| 7,365,308 B2 | 4/2008 | Trcka et al. | |
| 7,372,018 B2 | 5/2008 | Trcka et al. | |
| 7,511,266 B1 * | 3/2009 | Bothner | 250/269.2 |
| 7,566,869 B2 | 7/2009 | Riley et al. | |
| 8,346,481 B2 | 1/2013 | Jacobson et al. | |
| 2004/0133531 A1 * | 7/2004 | Chen et al. | 706/8 |
| 2005/0121606 A1 | 6/2005 | Gilchrist et al. | |

FOREIGN PATENT DOCUMENTS

| | | |
|---|---|---|
| WO | 2007015953 A2 | 2/2007 |
| WO | 2008070103 A2 | 6/2008 |
| WO | 2010071626 A1 | 6/2010 |
| WO | 2010123494 A1 | 10/2010 |

OTHER PUBLICATIONS

International Search Report and Written Opinion issued Nov. 30, 2009 for International Patent Application Serial No. PT/US09/58521, 7 pages.
Odom, R., Dahlin, T., Dolliver, D., et al., Design and Initial Field-Test Results of a New Pulsedneutron Logging System for Cased Reservoir Characterization, SPWLA Symposium Paper O, May 25-28, 2008, 9 pages, Edinburgh, Scotland.
Halliburton Thermal Multigate Decay-Lithology (TMD-L™) Product Brochure H01190-A4, Jan. 2008, 2 pages.
Halliburton Cased Hole Potassium-Uranium-Thorium (KUTh™) Computation Product Brochure H03574, Jan. 2008, 2 pages.
Schlumberger RST Reservoir Saturation Tools Product Brochure, PR_04_027_0, Aug. 2004, 2 pages.
Baker Hughes Reservoir Performance Monitor Product Brochure 30103 T, 2010, 8 pages.
Weatherford Pulsed Neutron Decay (PND®) Spectrum Tool Product Brochure 3730.03; 2006-2011, 2 pages.
Halliburton RMT Elite™ Reservoir Monitor Tool Product Brochure H02621, Jan. 2008, 4 pages.
Jacobson, L.A., Ethridge, D.R., and Wyatt, Jr., D.F.; Intrinsic Capture Cross-Section and Porosity Transforms for the TMD-L Pulsed Neutron Capture Tool, Society of Petroleum Engineers, Inc., Oct. 22-25, 1995, pp. 719-728, SPE 30597, Dallas, Texas.
Badruzzaman, A., Logan, J.P., Bean, C., Adeyemo, A.O., Zalan, T.A., Barnes, D., and Platt, C.; Is Accurate Gas/Steam Determination Behind Pipe Feasible with Pulsed Neutron Measurements?, Society of Petroleum Engineers, Inc., Oct. 30-Nov. 1, 2007, 18 pages, SPE 110098, Jakarta, Indonesia.
Badruzzaman, A., Badruzzaman, T., Zalan, T.A., and Mai, K.; Multi-Sensor Through-Casing Density and Saturation Measurement Concepts with a Pulsed Neutron Source: A Modeling Assessment; Society of Petroleum Engineers, Inc., Nov. 8-9, 2004, 14 pages, SPE 89884, Puebla, Mexico.
Badruzzaman, A., Neuman, C.H., Adeyemo, A.O., Dodman, C.A., Skillin, R.H., Zalan, T.A., Badruzzaman, T., et al.; Progress and Future of Pulsed Neutron Technology in Oil Field Management; Society of Petroleum Engineers, Inc., Sep. 27-30, 1998, 16 pages, SPE 49228, New Orleans, Louisiana.
GCC Search Report issued Oct. 19, 2012 for GCC Patent Application No. GCC/P/2009/14378, 9 pages.

* cited by examiner

SYSTEMS AND METHODS FOR DOWNHOLE FLUID TYPING WITH PULSED NEUTRON LOGGING

CROSS-REFERENCE TO RELATED APPLICATIONS

This application is a national stage application under 35 USC §371 of International Application No. PCT/US09/58521, filed Sep. 28, 2009. The entire disclosure of this prior application is incorporated herein by this reference.

BACKGROUND

The present disclosure relates generally to equipment utilized and operations performed in conjunction with subterranean wells and, in embodiments described herein, more particularly provides systems and methods for downhole fluid typing with pulsed neutron logging.

Well logging is a technique used to identify characteristics of earth formations surrounding a borehole. The interrogation of a formation surrounding a borehole to identify one or more characteristics may be by sound, electrical current, electromagnetic waves, or high energy nuclear particles (e.g., gamma particles and neutrons). Receiving the interrogating particle or signal, and determining a formation property from such particle or signal, is in many cases a complicated endeavor sometimes involving detecting the interrogating particles or signals at multiple detectors on a logging tool. Any system or method that enables precise determination of a formation property provides a competitive advantage in the marketplace.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve."

"Inelastic count rate" shall mean a gamma count rate during periods of time when gammas created by inelastic collisions are the predominant gammas created and/or counted (e.g., during a neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as a capture count rate.

"Dry gas" shall mean a relatively low molecular weight gas, such as methane, etc. Dry gases typically have densities of about 0.1 g/cc at commonly encountered downhole pressures but, of course, density can vary with temperature and pressure.

"Wet gas" shall mean a relatively high molecular weight gas, such as ethane, propane, etc. Wet gases typically have densities of about 0.3 g/cc at commonly encountered downhole pressures but, again, density can vary with temperature and pressure.

DETAILED DESCRIPTION

The various embodiments were developed in the context of wireline logging tools, and thus the description that follows is based on that developmental context. However, the various systems and methods find application not only in wireline logging tools, but also measurement-while-drilling (MWD) and logging-while-drilling (LWD) tools.

The various embodiments also find application in "slickline" tools, in which the logging tool is placed downhole (e.g., as part of a drill string, or as a standalone device) and the logging tool gathers data that is stored in a memory within the device (i.e., not contemporaneously transmitted to the surface). Once the tool is brought back to the surface, the data is downloaded, some or all the processing takes place, and the logging data is printed or otherwise displayed.

Thus, the developmental context (wireline conveyed logging tools) shall not be construed as a limitation as to the applicability of the various embodiments. Instead, the principles of this disclosure may be incorporated into any types of well tools.

Figure 1:
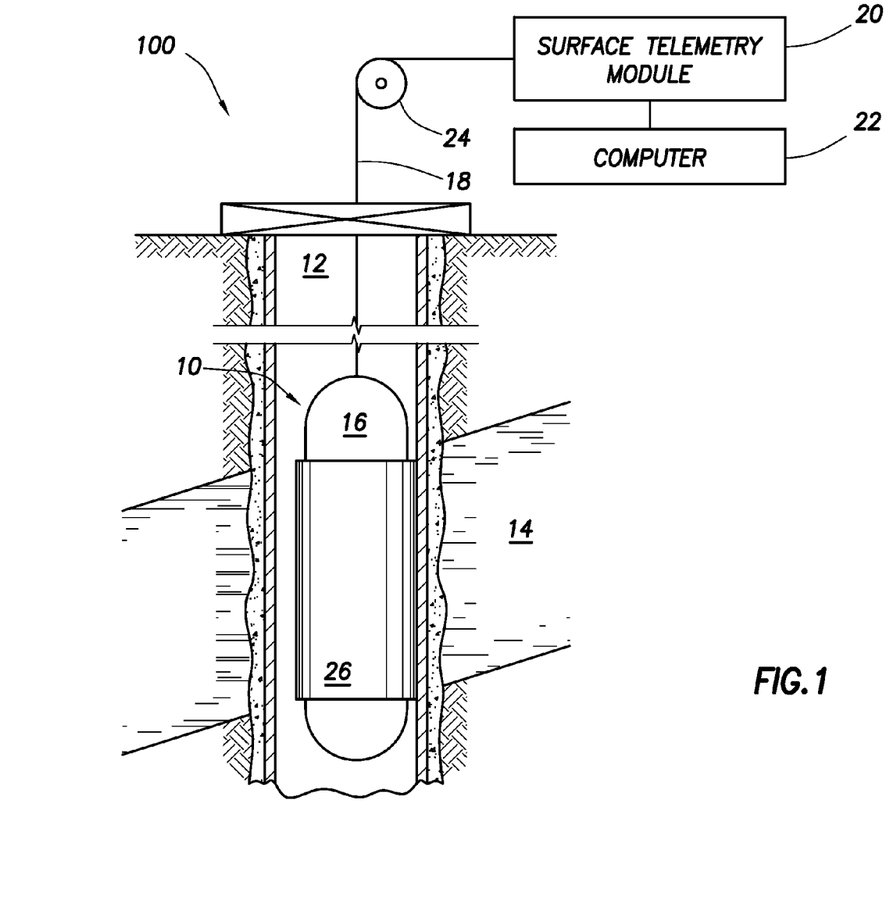
FIG. 1 is a schematic partially cross-sectional view of a nuclear logging system embodying principles of the present disclosure.

FIG. 1 illustrates a nuclear logging system 100 constructed in accordance with at least some embodiments. In particular, system 100 comprises a logging tool 10 placed within a borehole 12 proximate to a formation 14 of interest. The borehole 12 may be cased, as depicted in FIG. 1, or it may be uncased or open hole in an interval logged by the tool 10.

The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22.

The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive material 26 (the thickness of which is exaggerated for clarity in the figure). However, in other embodiments the material 26 may be only partially present or maybe omitted altogether.

Figure 2:
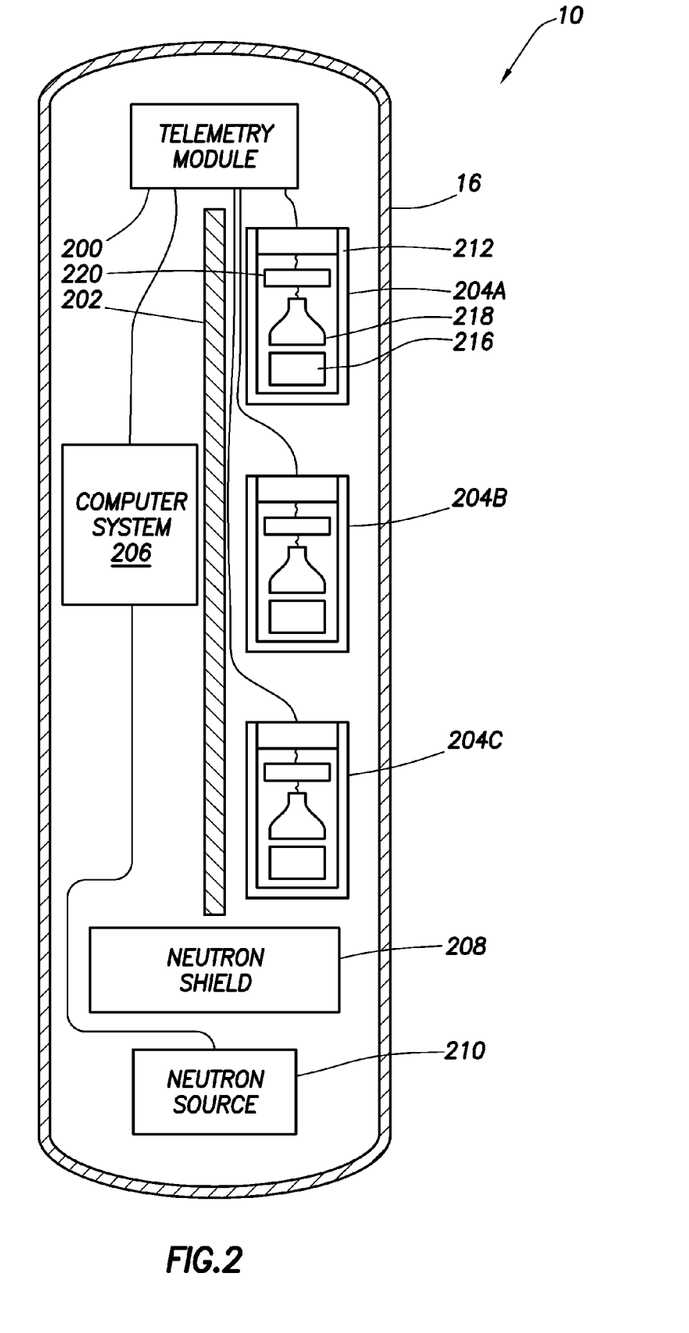
FIG. 2 is a schematic cross-sectional view of a logging tool which may be used in accordance with the principles of this disclosure.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case three gamma detectors labeled 204A, 204B and 204C), computer system 206, a neutron shield 208 and a neutron source 210.

While the gamma detectors 204 are shown above the neutron source 210, in other embodiments the gamma detectors may be below the neutron source. Gamma detector 204C may be on the order of 12 inches (~30.5 cm) from the neutron source. The gamma detector 204B may be on the order of 24 inches (~61 cm) from the neutron source 210. The gamma detector 204A may be on the order of 32.5 to 36 inches from the neutron source 210 (~82.5-91.4 cm). Other spacings may be equivalently used.

Neutron shield 202 may make the gamma detectors 204 receive more favorably formation-sourced gammas (as opposed to borehole-sourced gammas). The shield 202 may be a high density material (e.g., HEVIMET® available from General Electric Company of Fairfield, Conn.). In other embodiments, alternate or additional shields may be interposed between the detectors 204.

In some embodiments the neutron source 210 is a Deuterium/Tritium neutron generator. However, any neutron source capable of producing and/or releasing neutrons with sufficient energy (e.g., greater than 8 Mega-Electron Volt (MeV)) may equivalently be used.

The neutron source 210, under command from surface computer 22 in the case of wireline tools, or computer system 206 within the tool in the case of MWD, LWD or slickline tools, generates and/or releases energetic neutrons. In order to reduce the eradiation of the gamma detectors 204 and other devices by energetic neutrons from the neutron source 210, neutron shield 208 (e.g., HEVIMET®) separates the neutron source 210 from the gamma detectors 204.

Because of the speed of the energetic neutrons (e.g., 30,000 kilometers/second or more), and because of collisions of the neutrons with atomic nuclei that change the direction of movement of the neutrons, a neutron flux is created around the logging tool 10 that extends into the formation 14. Neutrons generated and/or released by the source 210 interact with atoms by way of inelastic collisions and/or thermal capture.

In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy.

At least some of the gammas created by the inelastic collisions are incident upon the gamma detectors 204. One or both of a) the arrival time of a particular gamma, and b) its energy may be used to determine its status as an inelastic gamma.

After one or more inelastic collisions (and corresponding loss of energy) a neutron reaches an energy known as thermal energy (i.e., a thermal neutron). At thermal energy a neutron can be captured by atomic nuclei.

In a capture event, the capturing atomic nucleus enters an excited state and the nucleus later transitions to a lower energy state by release of energy in the form of a gamma (known as a thermal gamma). At least some of the thermal gammas created by thermal capture are also incident upon the gamma detectors 204.

One or both of a) the arrival time of a particular gamma, and b) its energy may be used to determine its status as a capture gamma. Only inelastic and thermal capture interactions produce gammas, however.

Still referring to FIG. 2, when operational the gamma detectors 204 detect arrival and energy of gammas. Referring to gamma detector 204A as indicative of all the gamma detectors 204, a gamma detector comprises an enclosure 212, and within the enclosure 212 resides; a crystal 216 (e.g., a three inch by four inch yttrium/gadolinium silicate scintillation crystal); a photo multiplier tube 218 in operational relationship to the crystal 216; and a processor 220 coupled to the photomultiplier tube 218.

As gammas are incident upon/within the crystal 216, the gammas interact with the crystal 216 and flashes of light are emitted. Each flash of light itself is indicative of an arrival of a gamma, and the intensity of light is indicative of the energy of the gamma.

The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200 in the case of a wireline tool, or to the computer system 206 within the tool in the case of MWD, LWD or slickline tools.

Figure 3:
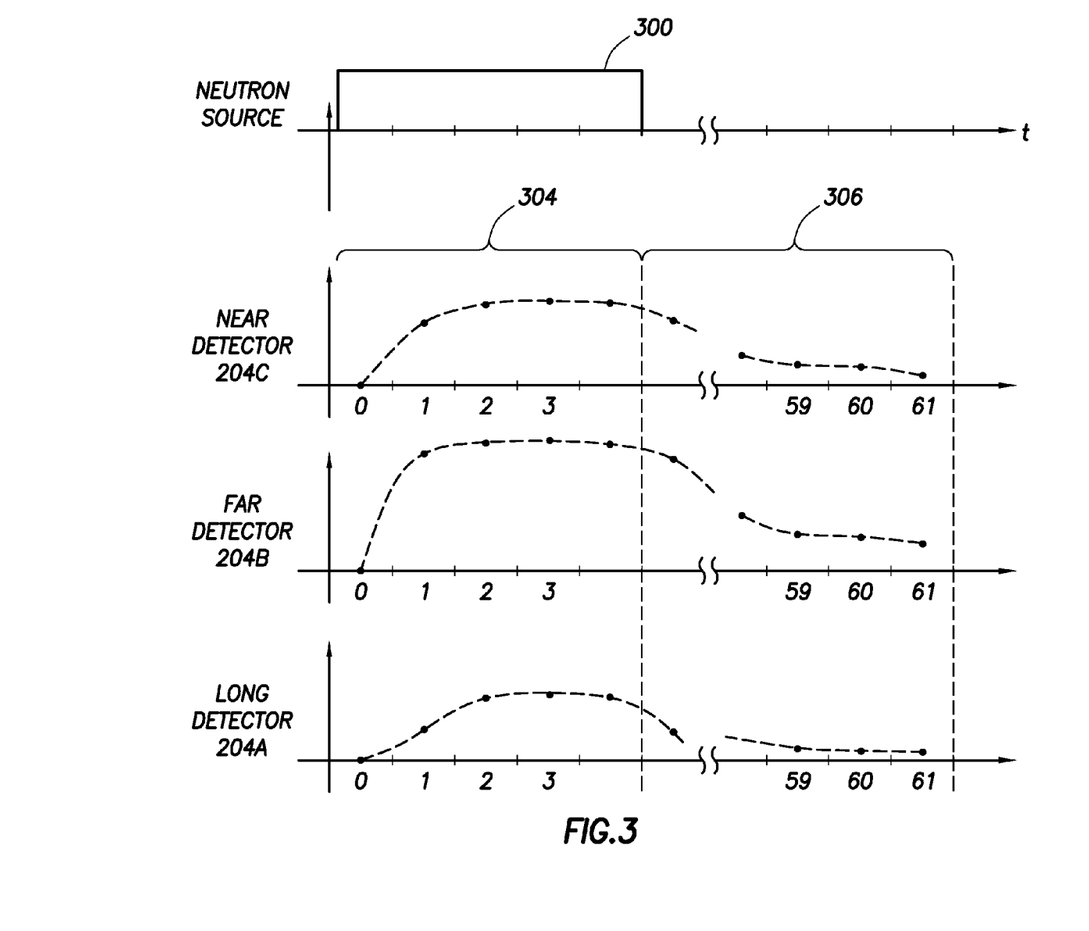
FIG. 3 is a plurality of graphs as a function of time representatively illustrating how gamma arrivals are recorded and characterized in a method embodying principles of this disclosure.

FIG. 3 shows a plurality of graphs as a function of corresponding time in order to describe how the gamma arrivals are recorded and characterized in accordance with at least some embodiments. In particular, FIG. 3 shows a graph relating to activation of the neutron source 210, as well as gamma count rates for the near detector 204C, the far detector 204B, and the long detector 204A.

The graph with respect to the neutron source 210 is Boolean in the sense that it shows when the neutron source is generating and/or releasing neutrons (i.e., the burst period), and when the neutron source is not. In particular, with respect to the neutron source graph, the neutron source is generating and/or releasing neutrons during the asserted state 300, and the neutron source is off during the remaining time.

In accordance with the various embodiments, a single interrogation (at a particular borehole depth) comprises activating the neutron source for a predetermined amount of time (e.g., 80 microseconds) and counting the number of gamma arrivals by at least one of the detectors during the activation time of the neutron source and for a predetermined amount of time after the source is turned off. In at least some embodiments, the total amount of time for a single interrogation (i.e., a single firing of the neutron source and the predetermined amount of time after the neutron source is turned off) may span approximately 1250 microseconds (μs), but other times may be equivalently used.

Still referring to FIG. 3, with respect to counting gamma arrivals by the gamma detectors 204, the interrogation time is divided into a plurality of time slots or time bins. With reference to the graph for the long detector 204A as illustrative of all the gamma detectors, in some embodiments the interrogation time is divided into 61 total time bins.

In accordance with at least some embodiments, the first 32 time bins each span 10 μs, the next 16 time bins each span 20 μs, and the remaining time bins each span 50 μs. Other numbers of time bins, and different time bin lengths, may be equivalently used.

Each gamma that arrives within a particular time bin increases the count value of gammas within that time bin. While in some embodiments the actual arrival time of the gammas within the time bin may be discarded, in other embodiments the actual arrival may be retained and used for other purposes.

Starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained.

In some cases, the system starts immediately again by activating the neutron source and counting further time bins. However, the count values within each time bin (for a particular borehole depth) are recorded either by way of the surface computer 22 in the case of wireline tools, or by the computer system 206 within the tool in the case of MWD, LWD or slickline tools.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector.

In accordance with the various embodiments, the plurality of count values is referred to as a gamma count rate decay curve. All the curves taken together (the curve for each gamma detector) may be referred to as full-set decay curves.

Because of the physics of the combined logging tool and surrounding formation, within certain time periods certain types of gammas are more likely to be created, and thus more likely to be counted by the one or more active gamma detectors 204. For example, during the period of time within which the neutron source 210 is activated (as indicated by line 300), the energy of neutrons created and/or released leads predominantly to creation of inelastic gammas.

The period of time in the gamma count rate decay curves where the gammas are predominantly inelastic gammas is illustrated by time period 304. Thus, gammas counted during some or all of the time period 304 may be considered inelastic gammas.

Some capture gammas may be detected during the time period 304, and in some embodiments the minority presence of capture gammas may be ignored. In yet still other embodiments, because capture gammas are distinguishable from inelastic gammas based on energy, the portion of the count rate during time period 304 attributable to capture gammas may be removed algorithmically.

Similarly, after the neutron source 210 is no longer activated, the average energy of the neutrons that make up the neutron flux around the tool 10 decreases, and the lower energy of the neutrons leads predominantly to creation of capture gammas. The period of time in the gamma count rate decay curves where the gammas are predominantly capture gammas is illustrated by time period 306.

Thus, gammas counted during some or all of the time period 306 may be considered capture gammas. Some inelastic gammas may be detected during the time period 306, and in some embodiments the minority presence of inelastic gammas may be ignored. In yet still other embodiments, because inelastic gammas are distinguishable from capture gammas based on energy, the portion of the count rate during time period 306 attributable to inelastic gammas may be removed algorithmically.

We have found that a gamma count rate decay curve from a single gamma detector may be used to determine a value indicative of fluid type in the formation 14 at the particular borehole depth for which the gamma count rate decay curve is determined. More particularly still, we have found that a relationship between the inelastic count rate and the capture count rate of a gamma count rate decay curve can be used to derive a fluid type indicative response value (FTIRV) which is indicative of fluid type (and more particularly, of gas type in certain embodiments).

Consider, as an example, a single gamma count rate decay curve, such as the long detector 204A gamma count rate decay curve of FIG. 3. In accordance with the various embodiments, the response value may be a ratio of the inelastic count rate to the capture count rate of the gamma count rate decay curve.

The inelastic count rate may be the summed count rate from one or more of the time bins within time period 304. In accordance with some embodiments, the count rates from all the time bins within time period 304 may be summed and used as the inelastic count rate.

The capture count rate may be the summed count rate from one or more of the time bins within time period 306. In accordance with some embodiments, the count rates from time bins within time period 306 that span 100 μs to 1000 μs after the deactivation of the neutron source 210 may be used.

In some embodiments, the ratio is the inelastic count rate divided by the capture count rate, and in other embodiments the ratio is the capture count rate divided by the inelastic count rate. Using the ratio, a fluid type in the surrounding formation 14 may be determined based on borehole 12 size, drilling fluid type, casing size (if present), pressure and porosity of the surrounding formation.

We have also found that gamma count rate decay curves from multiple gamma detectors may be used to determine a value indicative of fluid type in the formation 14 at the particular borehole depth for which the gamma count rate decay curves are determined. More particularly still, we have found that a relationship between the inelastic count rates of gamma count rate decay curves for respective different gamma detectors, and/or a relationship between the capture count rates of gamma count rate decay curves for respective different gamma detectors, can be used to derive a response value which is indicative of fluid type, or more particularly, of gas type.

Consider, as an example, multiple gamma count rate decay curves, such as the long detector 204A gamma count rate decay curve, the far detector 204B gamma count rate decay curve and the near detector 204C gamma count rate decay curve of FIG. 3. In accordance with various embodiments, the response value may be a ratio of the inelastic count rate of one of these curves to the inelastic count rate of another of the curves. In other embodiments, the response value may be a ratio of the capture count rate of one of these curves to the capture count rate of another of the curves.

In further embodiments, the response value may be a mathematical combination of any of the ratios discussed above (e.g., the ratio of inelastic and capture count rates for a single detector, the ratio of inelastic count rates for multiple detectors, and the ratio of capture count rates for multiple detectors). Thus, it should be understood that the response value may be calculated in any manner, according to any appropriate algorithm, in keeping with the principles of this disclosure.

Indeed, it is not necessary for the response value to be a ratio at all. The response value could instead be, for example, an inelastic and/or capture count rate itself, sums of such count rates, differences between such count rates, products of such count rates, or due to any appropriate algorithm applied to the count rates.

Figure 4:
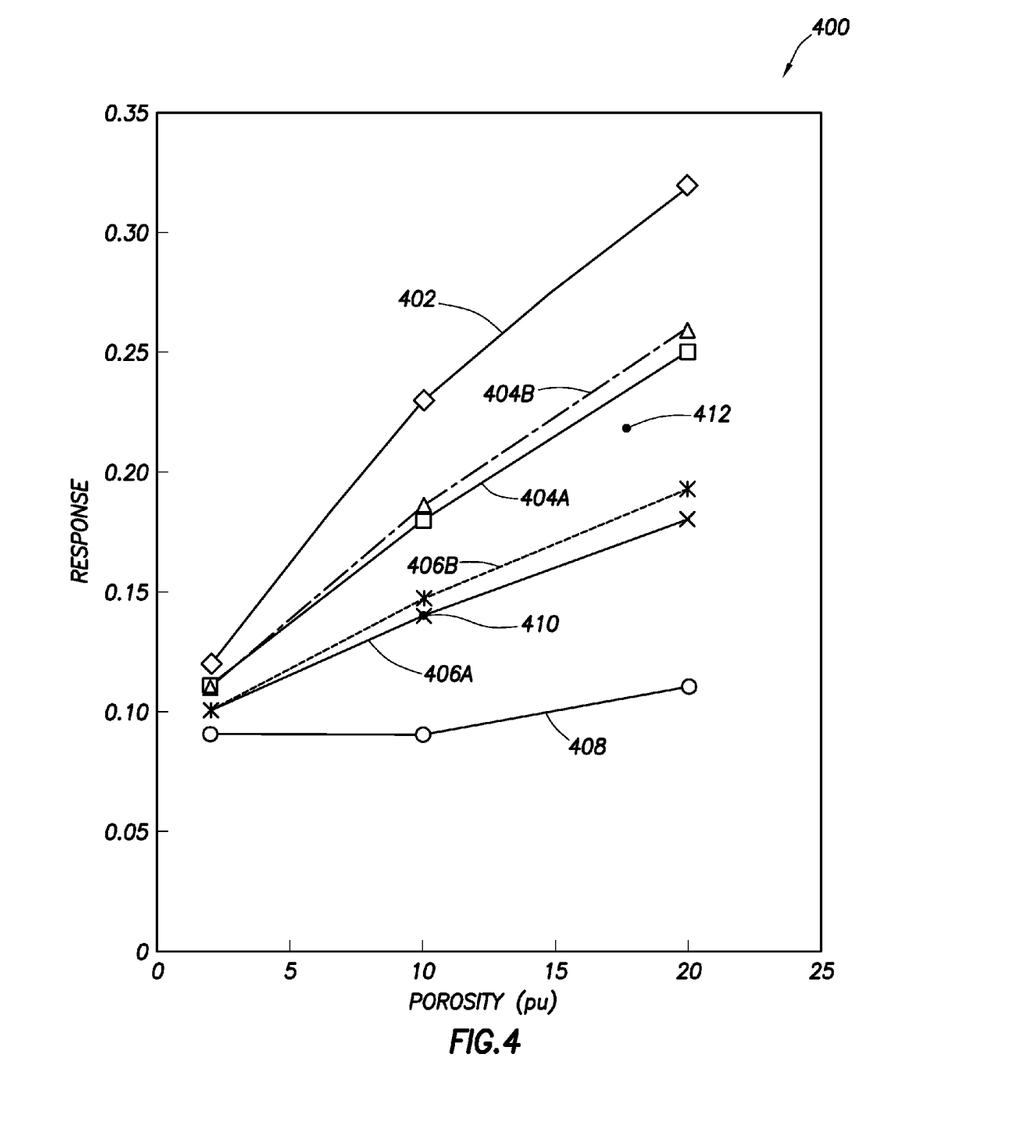
FIG. 4 illustrates graphs of fluid type indicative response values for different fluid types as a function of porosity, the graphs being representative of the response values for different pressures.

FIG. 4 shows an illustrative relationship between a range of possible response values, and a range of possible porosities of the formation, for a particular formation pressure. Plotted on the graph 400 of FIG. 4 are four different curves: 402 indicating a fluid type of oil, 404A indicating a fluid type of wet gas, 406A indicating a fluid type of dry gas, and 408 indicating a substantial lack of fluid (i.e., a depleted formation).

Note that, for a given porosity and a determined response value, one of the four fluid types will be indicated. For example, point 410 on the graph 400 (which corresponds to a porosity of 10 and a response value of 0.13) would indicate that the fluid type in the formation is dry gas.

In situations where a point corresponding to a given porosity and a determined response value does not fall on one of the curves 402-408, then the position of the point can provide an indication of the relative volumes of fluid types in the formation via interpolation. For example, point 412 on the graph may indicate that about ¾ of the volume of gas in the formation is wet gas and about ¼ of the volume is dry gas, since the point 412 is positioned a distance about three times as far from the dry gas curve 406A as from the wet gas curve 404A. The interpolation may be a linear interpolation, as in the example above, or the interpolation may be nonlinear, based on a simple or complex model, etc.

The graph 400 also depicts the dry and wet gas curves at a higher formation pressure (the oil and depleted curves do not change significantly with pressure). In the graph 400, curve 404B indicates a fluid type of wet gas at increased formation pressure, and curve 406B indicates a fluid type of dry gas at the increased formation pressure.

The curves 404B and 406B are very similar in form to the curves 404A and 406A. However, note that the wet gas and dry gas curves 404B, 406B are shifted upward somewhat in the graph 400 as compared to curves 404A, 406A of FIG. 4.

This demonstrates the effect of pressure on the density of the gas and, correspondingly, on the response value. Although the graph 400 is depicted in FIG. 4 for only two formation pressures, it will be appreciated that a graph could be produced for any given pressure. In addition, although only oil, wet gas and dry gas fluid types curves are shown in the graph 400, any other fluid type (e.g., fresh water, saline water, etc.) could be shown, if desired.

In practice, the formation pressure should be known (e.g., from concurrent measurements or previous logs), and so the various curves to be used in a particular situation will also be known. The curves for oil, wet gas, dry gas and/or other fluid types may be stored in a database (such as in a look-up table, etc.), or the curves may be represented as mathematical functions, with formation pressure being one of the variables used to calculate the curves. For example, the fluid type curves could be normalized for pressure.

Thus, it will be readily appreciated that, if the porosity, response value and pressure are known, the fluid type can also be known, using the principles of this disclosure. Accordingly, an operator can determine whether production of the fluid should be initiated or continued, the effectiveness of conformance operations, and other possible useful information. This information can be obtained even if the wellbore 12 is cased and cemented.

The various embodiments discussed to this point have been described as if the gamma count rate decay curves are obtained by a logging tool contemporaneously with calculating the response value and determining the fluid type(s) in the formation 14. However, in other embodiments calculating the response value and determining the fluid type(s) may take place non-contemporaneously with a logging tool obtaining the gamma count rate decay curves. Thus, the step of determining fluid type(s) may be performed using historical logging data gathered hours, days, weeks or months in advance.

The logging tool 10 of FIG. 2 illustrates three gamma detectors 204. However, the various embodiments of calculating the response and determining the fluid type may utilize the gamma count rate decay curves from a single gamma detector.

In some cases, the long detector 204A provides better gamma count rate decay curves for determining fluid type. However, as the porosity of the formation surrounding the borehole increases, better gamma count rate decay curves for determining fluid type may be obtained from the closer spaced gamma detectors 204.

Thus, in some embodiments, the gamma detector 204 used to read the gamma count rate decay curve for determination of fluid type is selected based on a value indicative of porosity. For example, if the porosity of the formation is known prior to running the tool 10 in the borehole 12 (i.e., the porosity is determined non-contemporaneously with obtaining the gamma count rate decay curves and held in a database), then a gamma detector 204 may be selected based on the previously determined porosity.

In other embodiments, although only one gamma detector 204 is needed for purposes of determining response values indicative of fluid type, two or more of the gamma detectors 204 may nevertheless be operational for measuring other formation parameters of interest, such as a value indicative of porosity. In embodiments where the value indicative of porosity (e.g., ratio of the capture count rate for two detectors) is measured contemporaneously with obtaining the gamma count rate decay curves, the gamma detector 204 used for determining the response value indicative of fluid type may be selected based on the contemporaneously determined value indicative of porosity. Furthermore, over the course of a single logging run, multiple gamma detectors 204 may be used, one at a time, for determining the response value indicative of fluid type based on the values indicative of porosity of the formation at different borehole depths.

Figure 5:
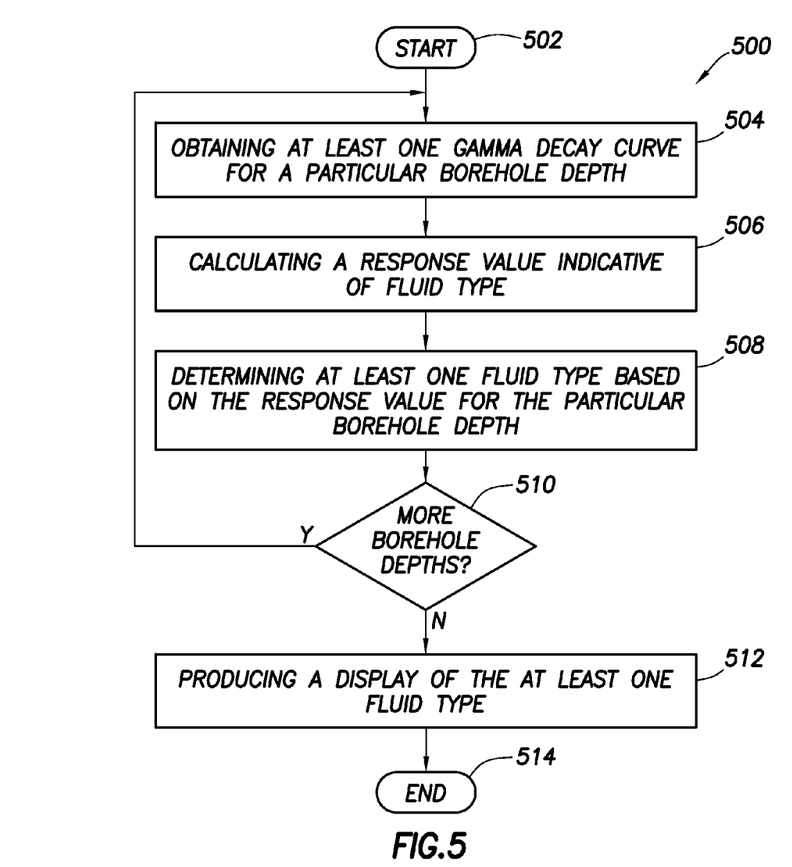
FIG. 5 is a flow chart representatively illustrating one embodiment of the method in which one or more fluid types are determined in accordance with the principles of this disclosure.

FIG. 5 illustrates a method 500 in accordance with at least some embodiments, where the method may be implemented, at least in part, by the computer system 22, the computer system 206 within the logging tool, or any other general purpose or special purpose computer system. In particular, the method 500 may be implemented by a suitable program stored on a computer-readable storage media.

The method 500 starts at block 502 and proceeds to obtaining at least one gamma decay curve for a particular borehole depth (block 504). In some embodiments, the obtaining is by operation of the nuclear logging tool contemporaneously with the further steps of the illustrative method, while in other embodiments the obtaining is from a database of gamma count rates generated based on operation of the nuclear logging tool non-contemporaneously contemporaneously with the further steps of the illustrative method.

Regardless of the precise mechanism of obtaining the gamma count rates, the illustrative method 500 then moves to calculating a fluid type indicative response value (FTIRV) at block 506. In some embodiments, the FTIRV is the inelastic count rate divided by the capture count rate, but in other embodiments the ratio is the capture count rate divided by the inelastic count, using a single gamma detector. In other embodiments, the FTIRV is a ratio of inelastic count rates or capture count rates from multiple gamma detectors.

In further embodiments, the FTIRV may be a mathematical combination of any of the ratios discussed above (e.g., the ratio of inelastic and capture count rates for a single detector, the ratio of inelastic count rates for multiple detectors, and the ratio of capture count rates for multiple detectors). The FTIRV may be calculated in any manner, according to any appropriate algorithm, in keeping with the principles of this disclosure.

Next, the method 500 moves to a determination of one or more fluid types based on the FTIRV at the particular borehole depth (block 508). The determination of the fluid type(s) is preferably based on porosity of the formation surrounding the borehole at the particular borehole depth, as well as pressure in the formation at that depth, such as by a relationship similar to that shown in illustrative FIG. 4.

While one value indicative of fluid type at a particular borehole depth may be useful in some circumstances, in some cases the gamma decay curve obtaining (block 504), FTIRV calculating (block 506) and fluid type determining (block 508) may be repeated for a plurality of borehole depths (block 510). Thus, a determination of how the fluid type(s) in the formation 14 vary along the depth of the borehole 12 can be obtained.

A display of the fluid type(s) is produced (block 512), and the illustrative method ends (block 514). The displaying may take many forms. In some cases, a paper plot with fluid type(s) indicated along the depth of the borehole may be created, and in yet other cases the display may be by way of a graphical display device (such as a computer monitor) coupled to a computer system. Other types of displays may be used in accordance with the principles of this disclosure.

Figure 6:
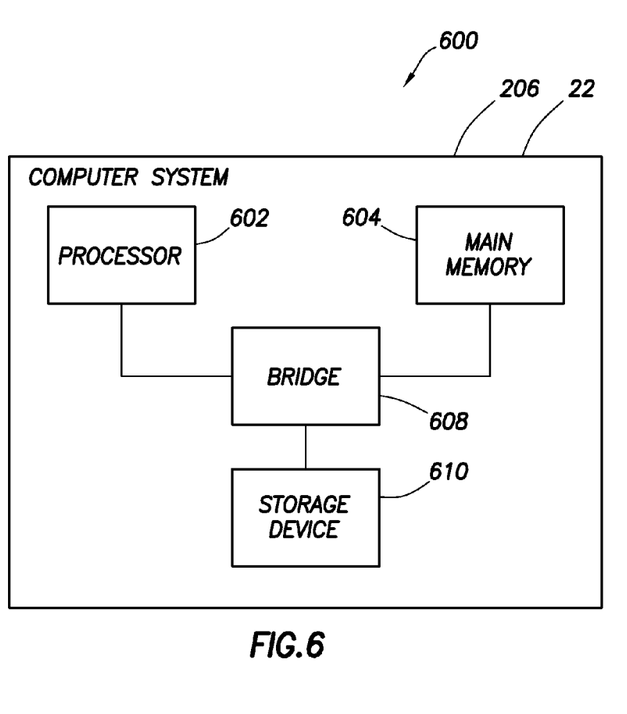
FIG. 6 is a schematic diagram of a computer system which may be used in accordance with the principles of this disclosure.

FIG. 6 illustrates in greater detail a computer system 600, which is illustrative of both the surface computer system 22 and the computer system 206 within the logging tool 10, either or both of which may be used. Thus, the computer system 600 described with respect to FIG. 6 could be proximate to the borehole during the time period in which the tool 10 is within the borehole, the computer system 600 could be located at the central office of the oilfield service company, or the computer system 600 could be within the logging tool 10 (such as for LWD, MWD or slickline tools).

The computer system 600 comprises a processor 602, and the processor couples to a main memory 604 by way of a bridge device 608. Moreover, the processor 602 may couple to a long term storage device 610 (e.g., a hard drive or a programmable memory device) by way of the bridge device 608.

Programs executable by the processor 602 may be stored on the storage device 610, and accessed when needed by the processor 602. The program stored on the storage device 610 may comprise programs to implement the various embodiments of the present specification, including programs to implement selecting a gamma detector to use in the fluid type determination, calculating the fluid type indicative response value, determining the fluid type(s), and producing a display of the fluid type(s).

In some cases, the programs are copied from the storage device 610 to the main memory 604, and the programs are executed from the main memory 604. Thus, both the main memory 604 and storage device 610 are considered computer-readable storage mediums.

The response values indicative of fluid type, as well as the determined fluid type(s), produced by the computer system 610 may be sent to a plotter that creates a paper log, and/or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above disclosure provides to the art many advancements and improvements, including a method 500 which includes obtaining gamma count rates at a particular borehole depth; calculating a fluid type indicative response value for the particular borehole depth; determining at least one fluid type based on the response value for the particular borehole depth; and producing a display of the at least one fluid type corresponding to the particular borehole depth.

Producing the display may include producing a paper plot of the at least one fluid type corresponding to the particular borehole depth.

Obtaining the gamma count rates may include obtaining gamma count rates using respective multiple gamma detectors for the particular borehole depth.

Calculating the fluid type indicative response value may include calculating a ratio of inelastic and capture count rates from a single gamma detector 204, and/or computing a mathematical function of count rates from a single gamma detector 204.

Calculating the fluid type indicative response value may include calculating a ratio of inelastic count rates from multiple gamma detectors 204, calculating a ratio of capture count rates from multiple gamma detectors 204, and/or computing a mathematical function of count rates from multiple gamma detectors 204.

Obtaining the at least one gamma decay curve may include operating a neutron source 210 within a borehole 12. Operating the neutron source 210 may include operating the neutron source 210 within a cased portion of the borehole 12.

Determining the at least one fluid type may include determining the at least one fluid type further based on a porosity of a formation 14 at the particular borehole depth, and further based on a pressure in the formation 14 at the particular borehole depth.

Also provided by the above disclosure is a system 100 which includes a downhole tool 10 comprising a neutron source 210 and at least one gamma detector 204. Gamma count rates are produced due to gamma arrivals at the at least one gamma detector 204. A processor 602 is coupled to a memory 604. The memory 604 stores a program that, when executed by the processor 602, causes the processor 602 to: calculate a fluid type indicative response value for a particular borehole depth based on the gamma count rates; and determine at least one fluid type based on the response value for the particular borehole depth.

The program may cause the processor 602 to calculate the fluid type indicative response value based on the gamma count rates produced due to the gamma arrivals at multiple gamma detectors 204 of the downhole tool 10.

The program may cause the processor 602 to calculate the fluid type indicative response value as a ratio of inelastic count rates and capture count rates due to the gamma arrivals at one gamma detector 204.

The program may cause the processor 602 to calculate the fluid type indicative response value as a mathematical function of the count rates due to the gamma arrivals at one gamma detector 204.

The program may cause the processor 602 to calculate the fluid type indicative response value as a ratio of inelastic count rates due to the gamma arrivals at multiple gamma detectors 204.

The program may cause the processor 602 to calculate the fluid type indicative response value as a ratio of capture count rates due to the gamma arrivals at multiple gamma detectors 204.

The program may cause the processor 602 to calculate the fluid type indicative response value as a mathematical function of the count rates due to the gamma arrivals at multiple gamma detectors 204.

The neutron source 210 may be positioned within a cased portion of a borehole 12.

The program may cause the processor 602 to determine the at least one fluid type further based on a porosity of a formation 14 at the particular borehole depth, and further based on a pressure in the formation 14 at the particular borehole depth.

The above disclosure also describes a computer-readable storage media 604 storing a program that, when executed by a processor 602, causes the processor 602 to: calculate a fluid type indicative response value for a particular borehole depth based on the gamma count rates; and determine at least one fluid type based on the response value for the particular borehole depth.

The above description is meant to be illustrative of the principles and various embodiments of the present disclosure. Numerous variations and modifications will become apparent to those skilled in the art once the above disclosure is fully appreciated.

For example, in some embodiments, the counts associated with capture gammas are removed from the inelastic count rate, and counts associated with inelastic gammas are removed from the capture count rate, prior to calculating the FTIRV. In other cases, however, the presence of counts of capture gammas in the inelastic count rate, and likewise the presence of inelastic gammas in the capture count, is ignored for purposes of calculating the FTIRV.

Furthermore, preprocessing of the data may take place, such as dead-time correction and environmental correction, without affecting scope of this specification. It is intended that the appended claims be interpreted to embrace all such variations and modifications.

It is to be understood that the various embodiments of the present disclosure described herein may be utilized in various configurations, without departing from the principles of the present disclosure. The embodiments are described merely as examples of useful applications of the principles of the disclosure, which is not limited to any specific details of these embodiments.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method comprising:
   obtaining at least one capture gamma count rate with a downhole tool at a particular borehole depth;
   calculating a fluid type indicative response value based on the at least one capture gamma count rate for the particular borehole depth; and
   determining at least one fluid type based on the response value for the particular borehole depth.

2. The method of claim 1, further comprising producing a display of the at least one fluid type corresponding to the particular borehole depth.

3. The method of claim 1, wherein obtaining the at least one capture gamma count rate further comprises using multiple gamma detectors for the particular borehole depth.

4. The method of claim 1, wherein calculating the fluid type indicative response value further comprises calculating a ratio of inelastic and capture count rates from a single gamma detector.

5. The method of claim 1, wherein calculating the fluid type indicative response value further comprises computing a mathematical function of count rates from a single gamma detector.

6. The method of claim 1, wherein calculating the fluid type indicative response value further comprises calculating a ratio of capture count rates from multiple gamma detectors.

7. The method of claim 1, wherein calculating the fluid type indicative response value further comprises computing a mathematical function of count rates from multiple gamma detectors.

8. The method of claim 1, wherein obtaining the at least one gamma decay curve further comprises operating a neutron source within a borehole.

9. The method of claim 8, wherein operating the neutron source further comprises operating the neutron source within a cased portion of the borehole.

10. The method of claim 1, wherein determining the at least one fluid type further comprises determining the at least one fluid type further based on a porosity of a formation at the particular borehole depth, and further based on a pressure in the formation at the particular borehole depth.

11. A system comprising:
    a downhole tool comprising a neutron source and at least one gamma detector;
    gamma count rates produced due to gamma arrivals at the at least one gamma detector;
    a processor coupled to a memory, wherein the memory stores a program that, when executed by the processor, causes the processor to:
    obtain at least one capture gamma count rate for a particular borehole depth;
    calculate a fluid type indicative response value based on the at least one capture gamma count rate for the particular borehole depth; and
    determine at least one fluid type based on the response value for the particular borehole depth.

12. The system of claim 11, wherein the program causes the processor to calculate the fluid type indicative response value based on the gamma count rates produced due to the gamma arrivals at multiple gamma detectors of the downhole tool.

13. The system of claim 11, wherein the program causes the processor to calculate the fluid type indicative response value based on a ratio of inelastic count rates and capture count rates due to the gamma arrivals at one gamma detector.

14. The system of claim 11, wherein the program causes the processor to calculate the fluid type indicative response value as a mathematical function of the count rates due to the gamma arrivals at one gamma detector.

15. The system of claim 11, wherein the program causes the processor to calculate the fluid type indicative response value based on a ratio of capture count rates due to the gamma arrivals at multiple gamma detectors.

16. The system of claim 11, wherein the program causes the processor to calculate the fluid type indicative response value as a mathematical function of the count rates due to the gamma arrivals at multiple gamma detectors.

17. The system of claim 11, wherein the neutron source is positioned within a cased portion of a borehole.

18. The system of claim 11, wherein the program causes the processor to determine the at least one fluid type further based on a porosity of a formation at the particular borehole depth, and further based on a pressure in the formation at the particular borehole depth.

19. A non-transitory computer-readable storage media storing a program that, when executed by a processor, causes the processor to:
   obtain at least one capture gamma count rate for a particular borehole depth;
   calculate a fluid type indicative response value based on the at least one capture gamma count rate for the particular borehole depth; and
   determine at least one fluid type based on the response value for the particular borehole depth.

20. The computer-readable storage media of claim 19, wherein the program causes the processor to calculate the fluid type indicative response value based on gamma count rates produced due to gamma arrivals at multiple gamma detectors of the downhole tool.

21. The computer-readable storage media of claim 19, wherein the program causes the processor to calculate the fluid type indicative response value based on a ratio of inelastic count rates and capture count rates due to gamma arrivals at one gamma detector.

22. The computer-readable storage media of claim 19, wherein the program causes the processor to calculate the fluid type indicative response value as a mathematical function of count rates due to gamma arrivals at one gamma detector.

23. The computer-readable storage media of claim 19, wherein the program causes the processor to calculate the fluid type indicative response value based on a ratio of capture count rates due to gamma arrivals at multiple gamma detectors.

24. The computer-readable storage media of claim 19, wherein the program causes the processor to calculate the fluid type indicative response value as a mathematical function of count rates due to gamma arrivals at multiple gamma detectors.

25. The computer-readable storage media of claim 19, wherein the neutron source is positioned within a cased portion of a borehole.

26. The computer-readable storage media of claim 19, wherein the processor causes the processor to determine the at least one fluid type further based on a porosity of a formation at the particular borehole depth, and further based on a pressure in the formation at the particular borehole depth.

* * * * *